US012430302B2

(12) United States Patent
BenHanokh et al.

(10) Patent No.: US 12,430,302 B2
(45) Date of Patent: Sep. 30, 2025

(54) REDUCING A SIZE OF METADATA FOR ONLINE DEDUPLICATION OPERATIONS

(71) Applicant: RED HAT, INC., Raleigh, NC (US)

(72) Inventors: Gabriel Zvi BenHanokh, Tel-Aviv (IL); Joshua Durgin, Canyon Country, CA (US)

(73) Assignee: Red Hat, Inc., Raleigh, NC (US)

(*) Notice: Subject to any disclaimer, the term of this patent is extended or adjusted under 35 U.S.C. 154(b) by 544 days.

(21) Appl. No.: 17/233,922

(22) Filed: Apr. 19, 2021

(65) Prior Publication Data
US 2022/0335022 A1 Oct. 20, 2022

(51) Int. Cl.
G06F 16/215 (2019.01)
G06F 16/22 (2019.01)
G06F 16/23 (2019.01)
G06F 16/2457 (2019.01)

(52) U.S. Cl.
CPC ........ G06F 16/215 (2019.01); G06F 16/2282 (2019.01); G06F 16/2322 (2019.01); G06F 16/24573 (2019.01)

(58) Field of Classification Search
None
See application file for complete search history.

(56) References Cited

U.S. PATENT DOCUMENTS

| 9,002,805 | B1* | 4/2015 | Barber | G06F 16/215 |
| | | | | 707/692 |
| 9,378,088 | B1* | 6/2016 | Piszczek | G06F 11/1008 |
| 10,496,626 | B2 | 12/2019 | Friedman et al. | |
| 10,795,812 | B1 | 10/2020 | Duggal et al. | |
| 10,795,891 | B2 | 10/2020 | Miller et al. | |
| 10,809,932 | B1* | 10/2020 | Armangau | G06F 16/13 |
| 10,908,831 | B2 | 2/2021 | Slater et al. | |
| 11,429,587 | B1* | 8/2022 | Barrell | G06F 16/215 |
| 2012/0109907 | A1 | 5/2012 | Mandagere et al. | |
| 2013/0173627 | A1* | 7/2013 | Apte | G06F 16/1748 |
| | | | | 707/769 |

(Continued)

FOREIGN PATENT DOCUMENTS

WO 2020145874 A1 7/2020

OTHER PUBLICATIONS

Srinivasan, K., et al., "iDedup: Latency-Aware, Inline Data Depublication for Primary Storage," NetApp, Inc., 2012, https://www.usenix.org/legacy/event/fast12/tech/full_papers/Srinivasan.pdf.

Primary Examiner — Amresh Singh
(74) Attorney, Agent, or Firm — Kilpatrick Townsend & Stockton LLP

(57) ABSTRACT

A metadata size can be reduced for online deduplication operations. For example, a computing device can generate a metadata entry describing a data block in a metadata table comprising a plurality of metadata entries describing a plurality of data blocks. The computing device can determine a length of time to be associated with the metadata entry for maintaining the metadata entry in the metadata table. The computing device can, subsequent to the length of time passing subsequent to generating the metadata entry, determine the metadata entry indicates a number of references to the data block is below a threshold. The computing device can, in response to determining the number of references is below the threshold, remove the metadata entry from the metadata table.

20 Claims, 3 Drawing Sheets

(56) References Cited

U.S. PATENT DOCUMENTS

| | | | |
|---|---|---|---|
| 2019/0107953 A1* | 4/2019 | Garg | G06F 12/0875 |
| 2020/0192760 A1 | 6/2020 | Toaff et al. | |
| 2021/0374021 A1* | 12/2021 | Santhakumar | G06F 3/0659 |

* cited by examiner

REDUCING A SIZE OF METADATA FOR ONLINE DEDUPLICATION OPERATIONS

TECHNICAL FIELD

The present disclosure relates generally to data deduplication. More specifically, but not by way of limitation, this disclosure relates to reducing a size of metadata for online deduplication operations.

BACKGROUND

Deduplication can involve storing an instance of a data block and having other instances of the data block point to that instance. To determine whether an instance of a data block already exists in a system, a hash of the data block can be calculated and compared to a list of hash values for data blocks that exist in the system. If the hash is in the list, it can be determined that the data block already exists in the system, so only a reference pointing to the data block can be stored, instead of storing the data block itself again. Deduplication reduces storage requirements when the same data block is requested to be stored multiple times in the system.

Deduplication may occur online or offline. For online deduplication, a metadata table can be generated and stored in the system. The metadata table can include a metadata entry of the hash and properties for each data block. For offline deduplication, a data block can be read from disk storage and a metadata table can be generated for the time of the deduplication process. Once the deduplication process ends, the metadata table can be removed. When a subsequent data block is read from disk, a new metadata table can be generated and then removed after that deduplication process.

DETAILED DESCRIPTION

Figure 1:
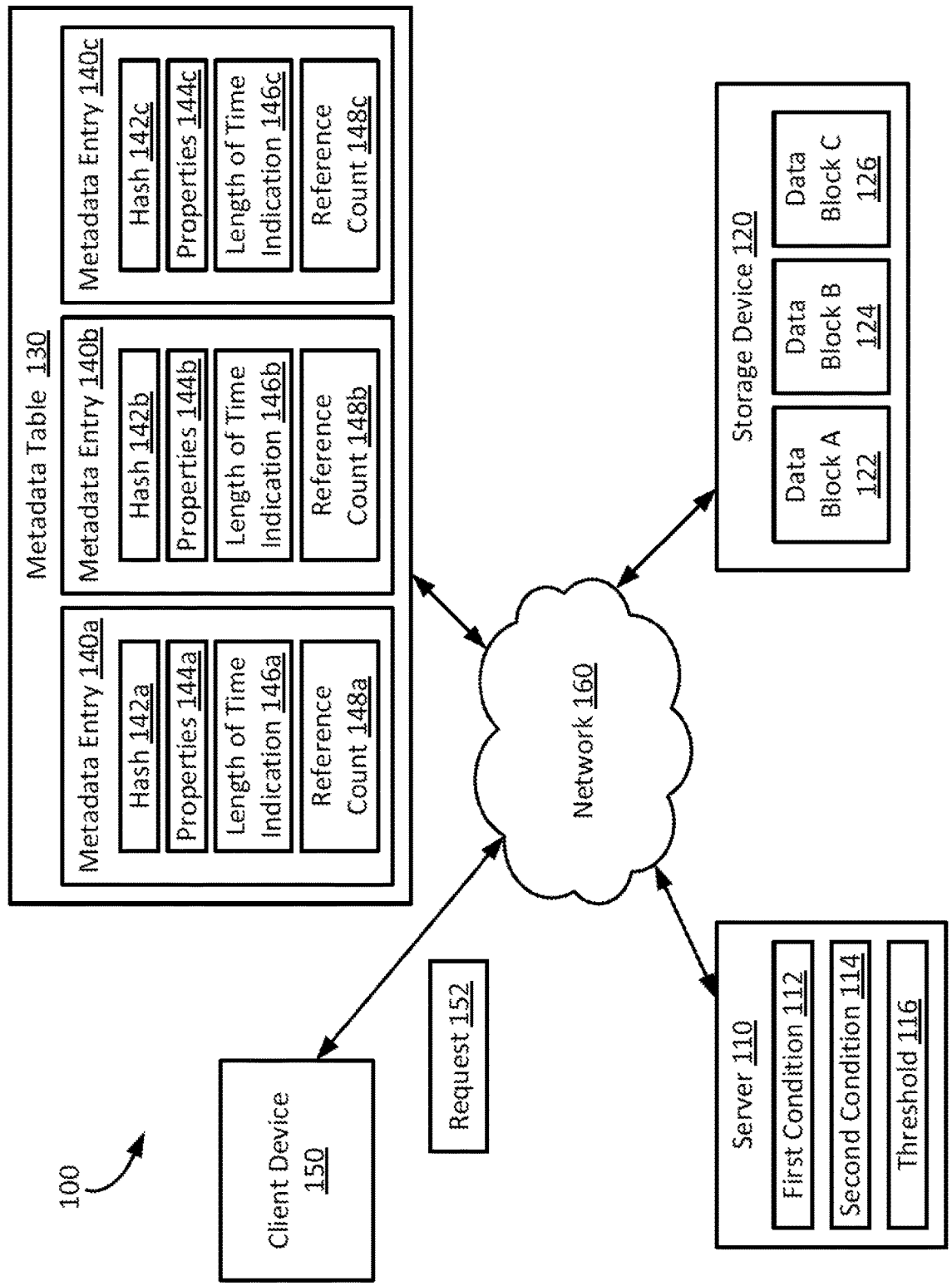
FIG. 1 is a block diagram of an example of a system for implementing metadata size reduction for online deduplication operations according to some aspects of the present disclosure.

Online data deduplication can be more efficient than offline deduplication, since a system can skip writing duplicated data to disk storage, along with other associated activities, such as updating a metadata table and a write-ahead-log. Online data deduplication can also allow the system to send an acknowledgement (ACK) to the host immediately. Additionally, the system may not read data from the disk storage for calculating a hash and fragmentation can be reduced since duplicated data can remain in the disk storage. But, the metadata table that is generated in online deduplication operations includes an entry for each data block, even if the data block is not deduplicated in the system. In other words, the metadata table maintains entries for data blocks for which there are no references pointing to the data block. Additionally, the metadata table may be replicated for recoverability purposes. As a result, maintaining a metadata table with entries for each data block can significantly increase overhead and reduce efficiency for a system.

Some examples of the present disclosure can overcome one or more of the abovementioned problems by providing a system that can determine a length of time for maintaining a metadata entry for a data block and remove the metadata entry after the length of time passes if the system includes no additional references to the data block. For example, the system can generate a metadata entry describing a data block in a metadata table. The metadata table can include multiple metadata entries describing multiple data blocks. The system can determine a length of time to be associated with the metadata entry for maintaining the metadata entry in the metadata table. The length of time may be predefined, or may be determined using a machine-learning model. Subsequent to the length of time passing since generating the metadata entry, the system can determine the metadata entry indicates a number of references to the data block is below a threshold. For example, a number of references greater than one can indicate the data block is deduplicated in the system, so the threshold may be two. In response to determining the number of references is below the threshold, the system can remove the metadata entry from the metadata table. Thus, only metadata entries that correspond to deduplicated data blocks may be maintained in the metadata table, thereby reducing storage requirements for the metadata table.

One particular example can involve a server of a system generating a metadata entry for data block A that is requested to be stored by a client device. The metadata entry can include a hash of data block A along with properties of data block A, such as a timestamp of when data block A was created and a number of references to data block A in the system. At the time of generation of the metadata entry for data block A, the number of references can be one, since no additional requests involve data block A prior to that time. The server can then determine a length of time for maintaining the metadata entry for data block A is one hour based on one hour being the predefined length of time for maintaining each new metadata entry. The server can run a background process, and after one hour, the server can determine whether the number of references is below a threshold of two, indicating data block A is only referenced once in the system, and thus is not deduplicated. The server can determine the number of references is one for data block A after the one hour and then remove the metadata entry for data block A from the metadata table using a trim command. This can reduce the size of the metadata table, and as a result, reduce overhead and storage requirements for the system.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing metadata size reduction for online deduplication according to some aspects of the present disclosure. The system 100 can include a server 110, a storage device 120, a metadata table 130, and a client device 150. Examples of the storage device 120 can include a hard disk drive, a solid-state drive, flash drive, etc. Examples of the client device 150 can include a desktop computer, a laptop, a mobile phone, server, etc. The client device 150, the server 110, the storage device 120, and the metadata table 130 can communicate over a network, such as a local area network (LAN) or the Internet.

In some examples, the server 110 receives a request 152 for a data object from the client device 150. The request 152 may be a request to store the data block in the storage device 120. For example, the request 152 can be a request to store data block A 122 in the storage device 120. Upon receiving the request 152, the server 110 can determine whether a copy of data block A 122 exists in the storage device 120 based on metadata entries in the metadata table 130. For example, metadata entries 140a, 140b may exist in the metadata table when the server 110 receives the request 152. Each of metadata entry 140a and metadata entry 140b can describe a data block in the storage device 120. The metadata entries 140a, 140b can include respective hashes 142a, 142b of the data blocks, and properties 144a, 144b of the data blocks that the metadata entries 140a, 140b describe. The metadata entries 140a, 140b can also include length of time indications 146a, 146b that indicate a length of time for maintaining the respective metadata entries 140a, 140b in the metadata table 130, and can also include reference counts 148a, 148b indicating a number of references to the data blocks described by metadata entries 140a, 140b. The reference counts 148a, 148b may be one when the metadata entries 140a, 140b are generated, and each time a request is received to store the same data block as those described by metadata entry 140a or metadata entry 140b, the respective reference count among reference counts 148a, 148b can be incremented by one. The lengths of time may be times to live (TTLs).

To determine whether data block A exists in the storage device 120, the server 110 can generate a hash of data block A 122 using a hashing function. The server 110 can compare the hash to hashes 142a, 142b of metadata entries 140a, 140b in the metadata table 130. If the hash matches either of hash 142a or hash 142b, the server 110 can determine data block A 122 is already stored in the storage device 120. For example, the server 110 can determine the hash of data block A 122 matches the hash 142a. Instead of generating another metadata entry, the server 110 can increment the reference count 148a by one. A timestamp in the metadata entry can also be updated for data block A 122. The server 110 can discard the request 152 and transmit an acknowledgement (ACK) back to the client device 150. Therefore, a duplicate of data block A 122 is not stored in the storage device 120, but an indication of an additional reference to data block A 122 is maintained.

In some examples, the hash for data block A 122 may not match either of hash 142a or hash 142b, and thus the server 110 can determine data block A 122 is not stored in the storage device 120. The server 110 can then store data block A 122 in the storage device 120 and generate a metadata entry 140c describing data block A 122. The metadata entry 140c can include the hash (hash 142c) of data block A 122, properties 144c of data block A 122 and the request 152, a length of time indication 146 indicating a length of time for maintaining the metadata entry 140c in the metadata table 130, and a reference count 148c indicating a number of references to data block A 122 in the storage device 120. Examples of the properties 144c can include a timestamp for when the metadata entry 140c is generated, a data location for data block A 122, and other information about data block A 122.

It may be advantageous to occasionally remove metadata entries in the metadata table 130 that describe data blocks that are only referenced once in the storage device 120, and thus include a reference count of one, to reduce a size of the metadata. At generation, a metadata entry can have a reference count of one. The server 110 can evaluate a metadata entry after the length of time indicated in the metadata entry has passed subsequent to the metadata entry being generated to determine whether the metadata entry is to be removed or not. The server 110 can determine the length of time so as to optimize the length of time for maintaining the metadata entry before determining whether to remove or maintain the metadata entry. A longer length of time may waste space maintaining a metadata entry that describes a data block with only one reference, whereas a short length of time may miss a deduplication opportunity and result in storage an additional copy of a data block that is already stored in the storage device 120.

To determine the length of time for maintaining a metadata entry, the server 110 may determine the length of time is predefined and set the length of time as the predefined length of time. In other examples, the server 110 may apply a machine-learning model to the metadata entry. The machine-learning model can be trained using previous metadata entries and lengths of time for maintaining the respective previous metadata entries. For example, the server 110 may apply a machine-learning model to metadata entry 140c describing data block A 122 and determine the length of time to be one hour. The length of time can then be included in the metadata entry 140c as the length of time indication 146c.

Additionally or alternatively, data blocks satisfying different conditions may be assigned different lengths of time. For example, data block A 122 may satisfy a first condition 112, and data block B 124 and data block C 126 may both satisfy a second condition 114. Examples of the first condition 112 and the second condition 114 can include associations with entities, types of data of the data blocks, etc. For example, the first condition 112 can involve a data block being associated with a first entity and the second condition 114 can involve a data block being associated with a second entity. Data block A 122 can be associated with the first entity, and thus satisfy the first condition 112. Additionally, data block B 124 and data block C 126 can each be associated with the second entity, and therefore satisfy the second condition 114. The first condition 112 can specify a first predefined length of time for data blocks that satisfy the first condition 112, and the second condition 114 can specify a second predefined length of time for data blocks that satisfy the second condition 114. As a result, the server 110 can determine the length of time for the metadata entry for data block A 122 is the first predefined length of time and the length of time for the metadata entries for data block B 124 and data block C 126 is the second predefined length of time.

In some examples, the server 110 can determine whether to remove a metadata entry from the metadata table 130 based on the number of references to the data block described by the metadata entry, as indicated by a reference count. The server 110 can determine to remove a metadata entry based on the reference count of the metadata entry being less than a threshold 116. For example, the threshold 116 can be two, and the server 110 can remove a metadata entry with a reference count below two after the length of time since generating the metadata entry passes. A reference count greater than the threshold 116 can indicate the data block is deduplicated in the system 100, and thus the metadata entry should be maintained in the metadata table 130.

As one particular example, the server 110 can generate metadata entry 140b for data block B 124. The server 110 can determine the length of time to include in the length of time indication 146b to be thirty minutes. At generation of metadata entry 140b, the server 110 can set the reference count 148b to one. During the thirty minute length of time, the server 110 can receive no additional requests to store data block B 124 in the storage device 120. Subsequent to the thirty minutes, the server 110 can determine the threshold 116 is two and that the reference count 148b is one. Thus, the reference count 148b is below the threshold 116, so the server 110 can remove metadata entry 140b from the metadata table 130, such as with a trim command. This can reduce the size of the metadata table 130, such that a majority of the entries in the metadata table 130 describe deduplicated data blocks. As a result, overhead for the system 100 can be reduced.

Alternatively, during the thirty-minute length of time, the server 110 may receive one additional request to store data block B 124 in the storage device 120. The server 110 can increment the reference count 148b by one in the metadata entry 140b instead of storing an additional copy of data block B 124, such that the reference count 148b becomes two. Subsequent to the thirty minutes, the server 110 can determine the threshold 116 is two and that the reference count 148b is two. Thus, the reference count 148b is not below the threshold 116, so the server 110 can maintain metadata entry 140b in the metadata table 130.

In some examples, the metadata table 130 can be a first in, first out (FIFO) list generated by the server 110. Each metadata entry in the FIFO list can be ordered based on the time in which the metadata entry was generated, as indicated by the timestamp. For example, metadata entry 140a can be generated prior to metadata entry 40b, so metadata entry 140a can be ordered higher than metadata entry 140b in the FIFO list. A metadata entry may be moved from the FIFO list to another metadata table if the reference count exceeds the threshold 116. Alternatively, a metadata entry that has previously been removed from the FIFO list when the reference count for the metadata entry exceeded the threshold 116 may be added back to the FIFO list if the reference count drops below the threshold 116 when a copy of the data block is deleted. If a predefined length of time is used, the server 110 can run a background process that begins at the top of the FIFO list and scans the FIFO list to remove metadata entries with a length of time less than a current time since generation of the metadata entries. Once the background process reaches an entry with a length of time higher than the current time, the background process can stop. In examples in which the length of time varies between metadata entries, a FIFO list can be generated for each length of time. The server 110 can run the background process on each FIFO list to remove metadata entries.

FIG. 1 is illustrative and non-limiting. Other examples may include more components, fewer components, different components, or a different arrangement of the components shown in FIG. 1. For example, although the system 100 includes three data blocks and three metadata entries in the example of FIG. 1, the system 100 may include a larger number of data blocks and metadata entries in other examples. Additionally, although not shown in FIG. 1, the metadata table 130 may be stored in a memory device, such as a cache memory.

Figure 2:
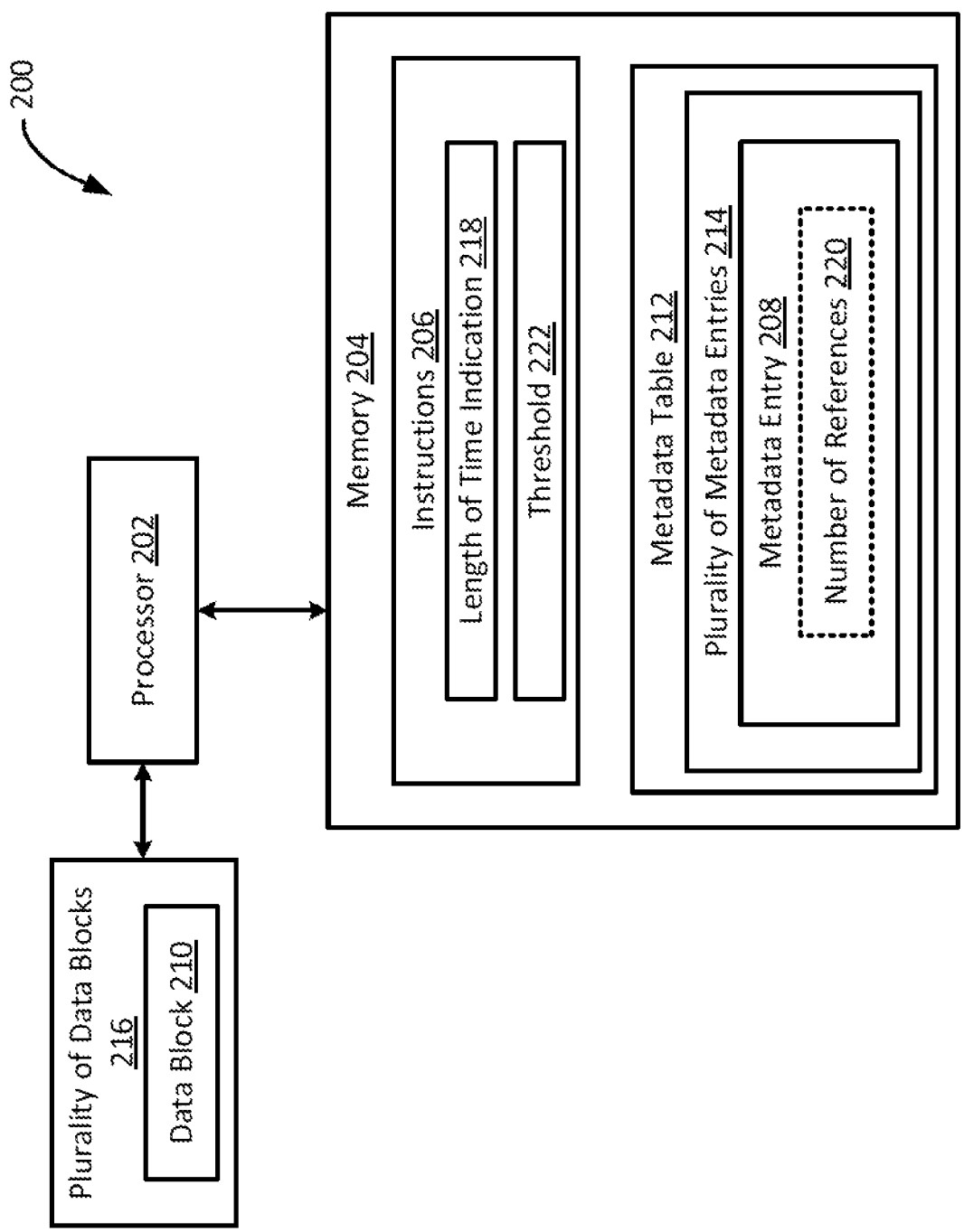
FIG. 2 is a block diagram of another example of system for implementing metadata size reduction for online deduplication according to some aspects of the present disclosure.

FIG. 2 is a block diagram of another example of a system 200 for implementing metadata size reduction for online deduplication according to some aspects of the present disclosure. The system 200 includes a processor 202. The processor 202 may be part of a server, such as the server 110 in FIG. 1.

In this example, the processor 202 is communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor 202 can generate a metadata entry 208 describing a data block 210 in a metadata table 212. The metadata table 212 can include a plurality of metadata entries 214 describing a plurality of data blocks 216. The processor 202 can determine a length of time, indicated by a length of time indication 218, to be associated with the metadata entry 208 for maintaining the metadata entry 208 in the metadata table 212. Subsequent to the length of time passing subsequent to generating the metadata entry 208, the processor 202 can determine the metadata entry 208 indicates a number of references 220 to the data block 210 is below a threshold 222. In response to determining the number of references 220 is below the threshold 222, the processor 202 can remove the metadata entry 208 from the metadata table 212. This may reduce a size of the metadata table 212, resulting in reduced resource consumption and overhead for the system 200.

Figure 3:
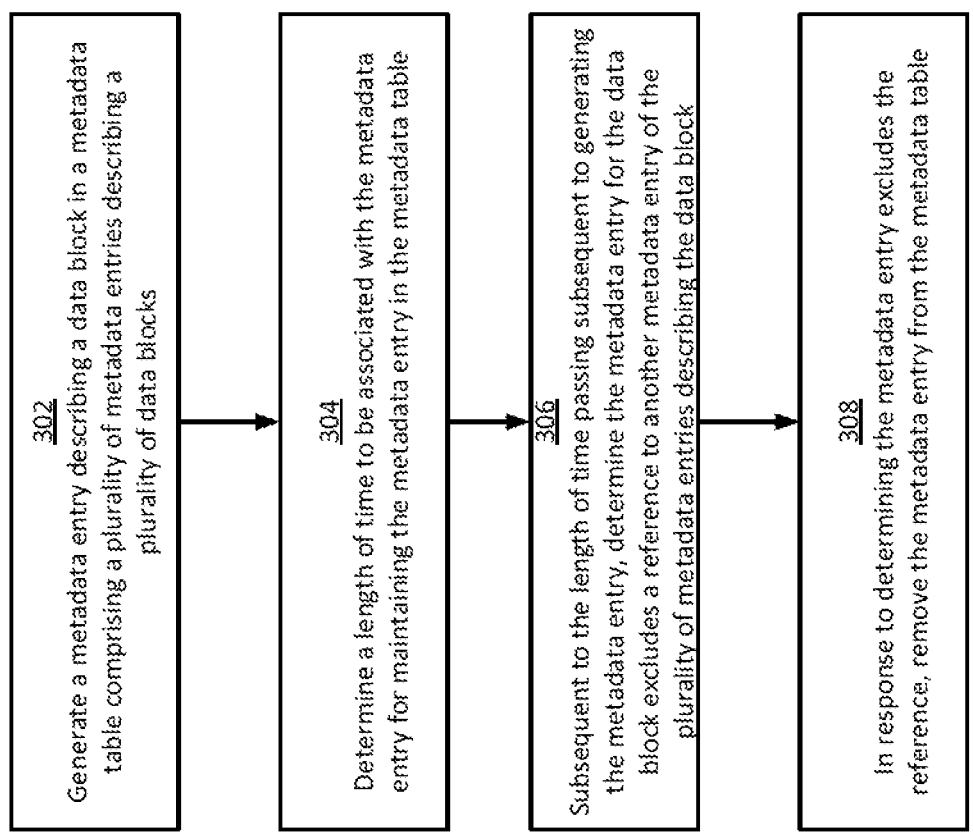
FIG. 3 is a flow chart of a process for metadata size reduction for online deduplication according to some aspects of the present disclosure.

The processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 can generate a metadata entry 208 describing a data block 210 in a metadata table 212. The metadata table 212 can include a plurality of metadata entries 214 describing a plurality of data blocks 216. To generate the metadata entry 208, the processor 202 can generate a hash of the data block 210, determine the metadata table 212 excludes a metadata entry including the hash, and generate the metadata entry 208 with the hash. The metadata entry 208 may additionally include properties of the data block 210 and a number of references 220 to the data block 210 in the system 200.

In block 304, the processor 202 can determine a length of time, indicated by a length of time indication 218, that is to be associated with the metadata entry 208. The length of time can correspond to a length of time for maintaining the metadata entry 208 in the metadata table 212. The length of time may be predefined based on the data block 210 satisfying a condition, or the processor 202 may apply a machine-learning model to the metadata entry 208 to determine the length of time. The processor 202 can provide the length of time to the metadata table 212 to be stored in the metadata entry 208.

In block 306, the processor 202 can, subsequent to the length of time passing subsequent to generating the metadata entry 208, determine the metadata entry 208 indicates a number of references 220 to the data block 210 is below a threshold 222. For example, the processor 202 may set the number of references 220 may be one when the processor 202 generates the metadata entry 208. Then, the processor 202 can increment the number of references 220 by one for any additional requests involving the data block 210 during the length of time. If the processor 202 receives no additional requests for the data block 210 during the length of time, the number of references 220 can be one subsequent to the length of time passing. The threshold 222 may be two, so the processor 202 can determine the number of references 220 is below the threshold 222.

In block 308, the processor 202 can, in response to determining the number of references 220 is below the threshold 222, remove the metadata entry 208 from the metadata table 212. Alternatively, if the processor 202 determines the number of references meets or exceeds the threshold 222, the processor 202 can maintain the metadata entry 208 in the metadata table 212. This management of the metadata table may ensure only metadata entries that describe deduplicated data blocks are maintained in the metadata table, thereby reducing a size of the metadata table and storage requirements of the system.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system for online data deduplication comprising:
a processor; and
a memory including instructions that are executable by the processor for causing the processor to:
generate, in a metadata table comprising a plurality of metadata entries describing a plurality of data blocks, a metadata entry describing a data block stored in a storage device;
determine a length of time to be associated with the metadata entry for maintaining the metadata entry in the metadata table, the length of time being based on the data block satisfying a condition;
include an indication of the length of time in the metadata entry;
subsequent to the length of time passing subsequent to generating the metadata entry, determine the metadata entry indicates that the data block is not deduplicated based on a number of references to the data block being below a threshold; and
in response to determining the number of references is below the threshold, reduce a size of the metadata table by removing the metadata entry from the metadata table in an operation that excludes removing the data block from the storage device.

2. The system of claim 1, wherein the memory further includes instructions that are executable by the processor for causing the processor to:
subsequent to the length of time passing subsequent to generating the metadata entry, determine the metadata entry for the data block indicates the number of references of the data block meets or exceeds the threshold; and
in response to determining the number of references meets or exceeds the threshold, maintain the metadata entry in the metadata table.

3. The system of claim 1, wherein the memory includes instructions that are executable by the processor for causing the processor to determine the length of time associated with the metadata entry by applying a machine-learning model to the metadata entry.

4. The system of claim 1, wherein the data block is a first data block, the condition is a first condition, and the metadata entry is a first metadata entry, and the memory further includes instructions that are executable by the processor for causing the processor to:
determine the first data block and a second data block of the plurality of data blocks each satisfy the first condition;
determine a third data block of the plurality of data blocks satisfies a second condition; and
determine the length of time for the first data block and the second data block is a first predefined length of time based on the first data block and the second data block satisfying the first condition and the length of time for the third data block is a second predefined length of time based on the third data block satisfying the second condition.

5. The system of claim 4, wherein the first condition comprises an association with a first entity and the second condition comprises an associated with a second entity.

6. The system of claim 1, wherein the metadata table comprises a first in, first out (FIFO) list that stores the plurality of metadata entries in an order based on a time of generation for each metadata entry.

7. The system of claim 1, wherein the memory includes instructions that are executable by the processor for causing the processor to generate the metadata entry for the data block by:
receiving a request to store the data block;
generating a hash of the data block; and
providing the hash of the data block and properties of the data block and properties of the request for storage in the metadata table.

8. A computer-implemented method for online data deduplication comprising:
generating, in a metadata table comprising a plurality of metadata entries describing a plurality of data blocks, a metadata entry describing a data block stored in a storage device;
determining a length of time to be associated with the metadata entry for maintaining the metadata entry in the metadata table, the length of time being based on the data block satisfying a condition;
including an indication of the length of time in the metadata entry;
subsequent to the length of time passing subsequent to generating the metadata entry, determining the metadata entry indicates that the data block is not deduplicated based on a number of references to the data block being below a threshold; and in response to determining the number of references is below the threshold, reducing a size of the metadata table by removing the metadata entry from the metadata table in an operation that excludes removing the data block from the storage device.

9. The method of claim 8, further comprising:
subsequent to the length of time passing subsequent to generating the metadata entry, determining the metadata entry for the data block indicates the number of references of the data block meets or exceeds the threshold; and
in response to determining the number of references meets or exceeds the threshold, maintaining the metadata entry in the metadata table.

10. The method of claim 8, further comprising determining the length of time associated with the metadata entry by applying a machine-learning model to the metadata entry.

11. The method of claim 8, wherein the data block is a first data block, the condition is a first condition, and the metadata entry is a first metadata entry, and the method further comprises:
determining the first data block and a second data block of the plurality of data blocks each satisfy the first condition;
determining a third data block of the plurality of data blocks satisfies a second condition; and
determining the length of time for the first data block and the second data block is a first predefined length of time based on the first data block and the second data block satisfying the first condition and the length of time for the third data block is a second predefined length of time based on the third data block satisfying the second condition.

12. The method of claim 11, wherein the first condition comprises an association with a first entity and the second condition comprises an associated with a second entity.

13. The method of claim 8, wherein the metadata table comprises a first in, first out (FIFO) list that stores the plurality of metadata entries in an order based on a time of generation for each metadata entry.

14. The method of claim 8, further comprising generating the metadata entry for the data block by:
receiving a request to store the data block;
generating a hash of the data block; and
providing the hash of the data block and properties of the data block and properties of the request for storage in the metadata table.

15. A non-transitory computer-readable medium comprising program code for online data deduplication that is executable by a processor for causing the processor to:
generate, in a metadata table comprising a plurality of metadata entries describing a plurality of data blocks, a metadata entry describing a data block stored in a storage device;
determine a length of time to be associated with the metadata entry for maintaining the metadata entry in the metadata table, the length of time being based on the data block satisfying a condition;
include an indication of the length of time in the metadata entry;
subsequent to the length of time passing subsequent to generating the metadata entry, determine the metadata entry indicates that the data block is not deduplicated based on a number of references to the data block being below a threshold; and
in response to determining the number of references is below the threshold, reduce a size of the metadata table by removing the metadata entry from the metadata table in an operation that excludes removing the data block from the storage device.

16. The non-transitory computer-readable medium of claim 15, wherein the program code further comprises instructions that are executable by the processor for causing the processor to:
subsequent to the length of time passing subsequent to generating the metadata entry, determine the metadata entry for the data block indicates the number of references of the data block meets or exceeds the threshold; and
in response to determining the number of references meets or exceeds the threshold, maintain the metadata entry in the metadata table.

17. The non-transitory computer-readable medium of claim 15, wherein the program code further comprises instructions that are executable by the processor for causing the processor to determine the length of time associated with the metadata entry by applying a machine-learning model to the metadata entry.

18. The non-transitory computer-readable medium of claim 15, wherein the data block is a first data block, the condition is a first condition, and the metadata entry is a first metadata entry, and the program code further comprises instructions that are executable by the processor for causing the processor to:
determine the first data block and a second data block of the plurality of data blocks each satisfy the first condition;
determine a third data block of the plurality of data blocks satisfies a second condition; and
determine the length of time for the first data block and the second data block is a first predefined length of time based on the first data block and the second data block satisfying the first condition and the length of time for the third data block is a second predefined length of time based on the third data block satisfying the second condition.

19. The non-transitory computer-readable medium of claim 15, wherein the metadata table comprises a first in, first out (FIFO) list that stores the plurality of metadata entries in an order based on a time of generation for each metadata entry.

20. The non-transitory computer-readable medium of claim 15, wherein the program code further comprises instructions that are executable by the processor for causing the processor to:
receiving a request to store the data block;
generating a hash of the data block; and
providing the hash of the data block and properties of the data block and properties of the request for storage in the metadata table.

* * * * *